Jan. 30, 1973  J. H. TAVEL  3,713,772
METHOD OF TESTING FOR DIABETES
Filed July 2, 1971
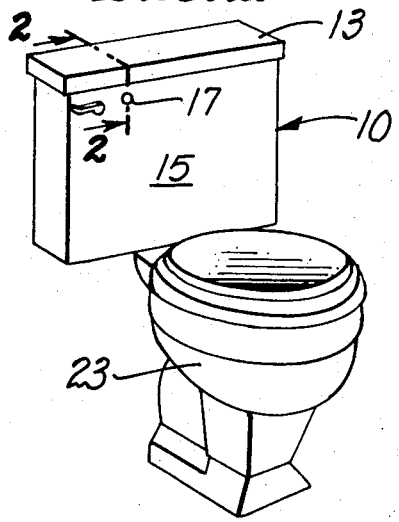
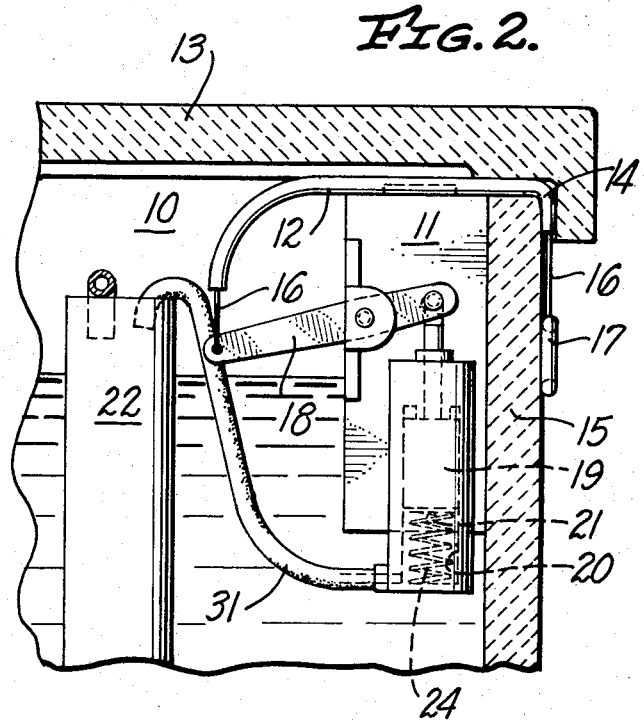
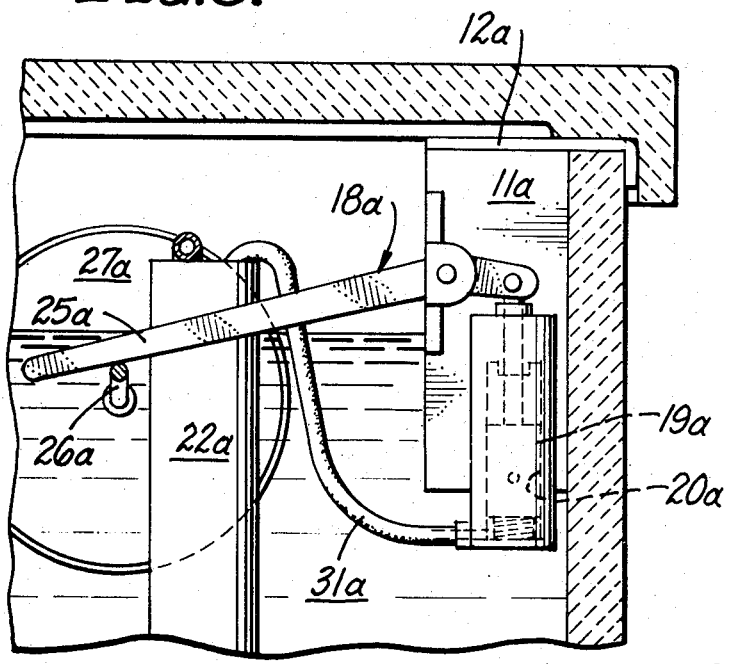
INVENTOR
JON H. TAVEL
BY
ROBERT C. COMSTOCK
ATTORNEY

United States Patent Office 3,713,772
Patented Jan. 30, 1973

3,713,772
METHOD OF TESTING FOR DIABETES
Jon H. Tavel, 17643 Belinda St., Encino, Calif. 91316
Filed July 2, 1971, Ser. No. 159,128
Int. Cl. G01n 31/22, 33/16
U.S. Cl. 23—230 B
7 Claims

ABSTRACT OF THE DISCLOSURE

A method of testing for diabetes in which the chemicals required for determining the presence of glucose in the urine are supplied to the water in a toilet bowl. Upon use of the toilet bowl for urination, a diabetes test is performed automatically by the chemical action which takes place in the bowl. The chemicals may be supplied each time the bowl is used or their supply may be selectively controlled by the user. An example is given in which the chemicals required for an enzyme test are supplied in liquid form.

BACKGROUND OF THE INVENTION

Field of the invention

The invention relates to a novel method of testing for diabetes.

Description of the prior art

Prior to the present invention, testing for diabetes has always involved either the impregnation of holding material such as wood, paper, cellulose, etc. with the testing chemicals or a concentration of the chemicals into a compressed form such as a tablet. The urine of a person being tested is then brought into contact with the impregnated or compressed testing chemicals.

This method of testing is inconvenient and a diabetic person may be reluctant to go through the required testing procedure as frequently as may be necessary or desirable.

Existing testing methods also do not lend themselves to practical use for the purpose of detecting the presence of diabetes in persons where its presence is either incipient or totally unexpected.

SUMMARY OF THE INVENTION

The invention relates to a novel method of testing for diabetes in which the water of a toilet bowl is supplied with testing chemicals whereby the diabetes test is performed simply and automatically upon the use of the toilet bowl for urination.

The supplying of the testing chemicals to the toilet bowl may be done automatically upon each use of the toilet or it may be under the control of the toilet user for use whenever desired.

The essential benefit of the invention is the simplicity and expedience of the testing procedure as compared with that of the prior art. There is no necessity for the person being tested or anyone else to handle any urine, chemicals or chemically impregnated materials.

In the case of a person who is already suffering from diabetes, the method provides a convenient and constant check on the glucose in the urine without requiring any particular effort on the part of the patient. In the case of others, the invention provides an immediate and dramatic warning of the presence of glucose in the urine as soon as it occurs.

It is among the primary objects of the invention to provide a method of testing for diabetes which is simpler and more expedient than those known in the prior art. Another object of the invention is to provide such a novel method which can be used by and which will benefit those already having diabetes, those who are suspected of possibly developing diabetes and members of the general public, since everyone is a potential diabetes victim.

A further object of the invention is to provide a method of testing for diabetes having all of the advantages and benefits set forth above and described hereinafter in this specification.

The invention also comprises such other objects, advantages and capabilities as will later more fully appear and which are inherently possessed by the invention.

While there are described herein preferred embodiments of the invention, it should be understood that the same are susceptible of modification and change without departing from the spirit of the invention.

DESCRIPTION OF THE DRAWINGS

FIG. 1 is an isometric view of a conventional toilet including one embodiment of a device for supplying testing chemicals to the toilet bowl;

FIG. 2 is an enlarged sectional view of the same taken on line 2—2 of FIG. 1, showing the chemical supplying device, which has a manually operated control;

FIG. 3 is a view similar to FIG. 2, showing a chemical supplying device with an automatic control operable each time the toilet is flushed.

DESCRIPTION OF THE PREFERRED EMBODIMENTS

One preferred embodiment which has been selected to illustrate my invention is shown in FIGS. 1–2 of the drawings. In this embodiment, a conventional toilet tank 10 is provided on its upper interior with a chemical supply reservoir 11 which may be permanently or temporarily mounted within the tank 10.

In the structure shown in FIG. 2 of the drawings, a rigid tube 12 extends horizontally beneath the lid 13 of the tank 10. The outer end of the tube 12 is bent downwardly at a right angle to form a hook 14, which fits around and grips the upper edge of the wall 15 of the tank 10. The reservoir 11 is attached to and suspended from the mid-portion of the tube 12, so that the reservoir 11 fits against the inside of the wall 15.

The inner end of the tube 12 is curved downwardly to a vertical position. A control wire or cord 16 slidably extends through the tube 12. Attached to the outer end of the cord 16 is a ring 17, which may be used for manual control of the chemical supplying mechanism.

The inner end of the cord 16 is attached to the outer end of a lever arm 18, the midportion of which is pivotally mounted on the reservoir 11. The inner end of the lever arm 18 is attached to the upper end of the piston 19.

When the ring 17 is pulled downwardly, the cord 16 moves the inner end of the lever arm 18 upwardly, causing the piston 19 to move downwardly within a chamber 20 in which it is mounted for reciprocal movement. The chamber 20 is connected to the reservoir 11 through an opening 21. Downward movement of the piston 19 draws the chemical carrying fluid in the lower part of the chamber out through a tube 31 into the conventional overflow pipe 22 of the toilet. This connects directly to the bowl 23. A coil spring 24 returns the piston 19 to its normal upward position.

In FIG. 3 of the drawings, essentially the same mechanism is used to provide a fully automatic operation. The reservoir 11a is mounted by a member 12a. A lever arm 18a is bent between its ends so that its inner end 25a is disposed directly above the pivotal rod 26a which is connected to the float 27a.

In this embodiment, the piston 19a is normally in downward position. When the toilet is flushed, the float 27a moves downwardly as the water drains out of the tank 10a. The inner end 25a of the lever arm 18a moves downwardly, raising the piston 19a to prevent the lower part of the chamber 20a to be filled with fluid from the reservoir 11a.

After the flushing of the toilet bowl has been completed, the tank 10a refills and the water level raises the float 27a and its pivotal rod 26a. The rod 26a moves the inner end 25a of the lever arm 18a upwardly, causing the piston 19a to move downwardly and discharge the fluid from the chamber 20a through the tube 31a into the overflow pipe 22a and thus enter the toilet bowl. In this manner, the toilet bowl is automatically supplied with the necessary testing chemicals after each flushing operation.

A preferred specific chemical formula which may be used is supplied to the toilet bowl so that each pint of water in the bowl will contain approximately the following:

3 ml. liquid glucose oxidase
5 mg. horseradish peroxidase
5 ml. orthotolidine
2 gr. sodium citrate
1 gr. citric acid
½ gr. boric acid In addition, a suitable coloring agent of the type well known to the art may be used for aesthetic purposes only. A non-ionic detergent such as Triton X-100 may also be used for cleaning purposes only, in whatever strength is desired for cleaning the bowl. It will not interfere with the presence or action of the chemical solution. Triton X-100 is a surfactant based on an alkyl-aryl polyether alcohol produced by Rohm & Haas, Inc., Independence Mall W., Philadelphia, Pa. 19105.

A sufficient amount of buffer (sodium citrate and citric acid or any suitable type well known to those skilled in the art) should be used to control the pH, so that the pH of the urine will be dominated and the pH in the toilet bowl will be maintained in the range between four and six, preferably about five.

Variations in the foregoing formula are possible, within the knowledge of those skilled in the art, such as the following variations measured in parts by volume;

|  | Parts |
|---|---|
| Liquid glucose oxidase | 25–250 |
| Horseradish peroxidase | 1–50 |
| Orthotolidine | 20–100 |
| Non-ionic detergent | 1–50 |

Sodium citrate and citric acid to maintain pH 4–6.

The orthotolidine may be replaced by other suitable agents to provide a different color of indicator. For example, 3-methoxy-4-hydroxy benzal p-dimethylamino aniline may be used in a quantity of approximately 4 gr. in the above specific formula.

As stated above, it is believed to be most convenient to supply the necessary chemicals in the form of a liquid solution. With the foregoing formula, approximately one-tenth of an ounce would be required for each pint of water. The necessary chemicals might also be supplied in a solid form, if so desired.

The invention preferably utilizes an enzyme test for glucose of a type well known to those skilled in the art. The principles underlying the basic reactions of such tests are well known. Glucose oxidase catalyzes the aerobic oxidation of glucose to produce gluconic acid and hydrogen peroxide. A substance having peroxidative activity is then capable of inducing the oxidation of an indicator, such as orthotolidine, in the presence of the hydrogen peroxide formed by the glucose oxidase. The degree of oxidation of the indicator, and thus its resulting shade of color, is directly related to the amount of glucose present in the urine sample being tested.

It will be understood that the foregoing chemical solution comprises one specific example of an enzyme type of test which is suitable for use with the present invention. Various other chemical formulations for enzyme diabetes tests are disclosed in U.S. Pats. 3,298,789, 3,164,534, 3,384,554, 2,848,308, 3,350,278 and others. Other types of tests, solutions, solids and chemical formulas and components may be used of any suitable type known to those skilled in the art.

In use, the person being tested need only use the toilet for urination purposes in a perfectly conventional and everyday manner. The supplying of the necessary testing chemicals can be performed manually and selectively, as illustrated in FIG. 2 of the drawings, or automatically, as illustrated in FIG. 3 of the drawings.

For occasional testing or for the use of outside toilets, a vial containing one or more units of testing chemicals may be used to pour the formula into the bowl. The testing chemicals may also be supplied in powder or tablet form, in single or multiple test quantities. Regardless of what method is used, the chemicals may be supplied to bowl either before or after urination, with the same results and chemical action taking place in the bowl.

In all cases, the test is performed automatically in the toilet bowl, with test results which are immediate and which can be directly observed by the user.

I claim:

1. A method of testing for diabetes comprising supplying the chemicals required for detecting the presence of glucose in urine to the water in a toilet bowl, and using said water as a testing medium, whereby after the use of said bowl for urination a diabetes test is automatically performed by the chemical action within said bowl between said chemicals and urine.

2. The method described in claim 1, and supplying said chemicals in liquid form.

3. The method described in claim 2, and supplying said chemicals from a supply reservoir disposed adjacent to the toilet bowl.

4. The method described in claim 3, and supplying said chemicals automatically upon each use of the toilet bowl.

5. The method described in claim 1, and testing with an enzyme test whereby the shade of color of the water in said bowl indicated the amount of glucose present in the urine.

6. The method described in claim 5, and supplying said chemicals so that each pint of water in said bowl contains approximately the following parts per volume, liquid glucose oxidase 25–250 parts, horseradish peroxidase 1–50 parts, indicator 20–100 parts, and a buffer to maintain the pH in the bowl in the range between 4 and 6.

7. The method described in claim 6, and supply each pint of water in said bowl with approximately 3 ml. liquid glucose oxidase, 5 mg. horseradish peroxidase, 5 ml. orthotolidine, 2 gr. sodium citrate, 1 gr. citric acid, and ½ gr. boric acid.

References Cited

UNITED STATES PATENTS

| 2,848,308 | 8/1958 | Free | 23—230 B X |
| 3,466,145 | 9/1969 | Van Duyne | 23—253 R |

MORRIS O. WOLK, Primary Examiner

R. M. REESE, Assistant Examiner

U.S. Cl. X.R.

195—103.5 C